(12) United States Patent
Miller et al.

(10) Patent No.: US 7,603,281 B1
(45) Date of Patent: Oct. 13, 2009

(54) METHOD, COMPUTER PROGRAM, AND SYSTEM FOR PUSHING FLIGHT INFORMATION TO PASSENGERS

(75) Inventors: Paul J. Miller, Marietta, GA (US); Asit K. Jena, Suwanee, GA (US)

(73) Assignee: Worldspan LP, Atlanta, GA (US)

(*) Notice: Subject to any disclaimer, the term of this patent is extended or adjusted under 35 U.S.C. 154(b) by 1561 days.

(21) Appl. No.: 09/687,303

(22) Filed: Oct. 12, 2000

(51) Int. Cl.
*G06Q 10/00* (2006.01)

(52) U.S. Cl. .............................. 705/1; 705/5
(58) Field of Classification Search .............. 705/1, 705/5, 6
See application file for complete search history.

(56) References Cited

U.S. PATENT DOCUMENTS

| | | | | |
|---|---|---|---|---|
| 5,623,260 | A | | 4/1997 | Jones ........................ 340/994 |
| 5,901,287 | A | * | 5/1999 | Bull et al. .................. 709/218 |
| 6,040,781 | A | * | 3/2000 | Murray ................... 340/825.22 |
| 6,278,936 | B1 | | 8/2001 | Jones ........................ 701/201 |
| 6,317,060 | B1 | * | 11/2001 | Jones ........................ 340/994 |
| 6,411,891 | B1 | | 6/2002 | Jones ........................ 701/201 |
| 6,415,207 | B1 | | 7/2002 | Jones ............................ 701/1 |
| 6,459,913 | B2 | * | 10/2002 | Cloutier ..................... 455/567 |
| 6,486,801 | B1 | | 11/2002 | Jones ........................ 340/994 |
| 6,492,912 | B1 | | 12/2002 | Jones ........................ 340/994 |
| 6,496,568 | B1 | * | 12/2002 | Nelson ..................... 379/88.12 |
| 6,510,383 | B1 | | 1/2003 | Jones ........................ 701/209 |

(Continued)

FOREIGN PATENT DOCUMENTS

JP     63-21111   * 11/1994

OTHER PUBLICATIONS

PR Newswire: "The SABRE Group Announces Exclusive Flight Paging Feature Available Through Travelocity Web Site"; Feb. 25, 1997.*

Ng: Something to Talk About (Agentless speech-recognition tools are teh lates high-tech offering in the corporate travel arena Travel Agent, Aug. 25, 1997, vol. 287, No. 7, p. 37.*

(Continued)

*Primary Examiner*—Janice A. Mooneyham
*Assistant Examiner*—Paul R Fisher
(74) *Attorney, Agent, or Firm*—Womble Carlyle Sandridge & Rice, PLLC

(57) ABSTRACT

A method, computer program, and system for automatically pushing flight status information to passengers and/or their agents whenever an airline flight is delayed, cancelled, or otherwise subject to a status change. The invention is implemented with a computer program that instructs a host computer operated by a global airline distribution provider. The computer program includes: a code segment for receiving and storing in a database scheduled times of departure or arrival for substantially all U.S. airline flights departing or arriving within a certain time; a code segment for receiving and storing in the database any updated times of departure or arrival for the flights; a code segment for comparing, for each of the flights, the scheduled time of departure or arrival to the updated time of departure or arrival; a code segment for flagging records in the database corresponding to flights in which the updated times of departure or arrival vary from the scheduled times of departure or arrival by a predetermined amount of time; and a code segment for periodically querying all flagged records and pushing notification information to at least one passenger or an agent of the passenger on each flight corresponding to a record that has been flagged.

7 Claims, 1 Drawing Sheet

| FLT NBR | LEG | DEPART ARRIVE | SCHEDULE | NEW | ESTIMATED TIME OF DEPARTURE | ACTUAL TIME OF DEPARTURE | DC | GATE | BAG | TIME |
|---|---|---|---|---|---|---|---|---|---|---|
| AA2856 | PHX | D | 0845 | | | | 0 | 34 | | |
| | LAX | A | 1014 | | | | 0 | D12 | | |
| AA2856 | LAX | D | 1105 | | | | 0 | C7 | | |
| | SFO | A | 1225 | | | | 0 | 12 | | |
| NW19 | BOS | D | 1135 | | | | 0 | | | |
| | MSP | A | 1351 | | | | 0 | | | |
| NW19 | MSP | D | 1445 | | | | 0 | | | |
| | NRT | A | 1655 | | | | 1 | | | |
| NW19 | NRT | D | 1815 | | | | 1 | | | |
| | SIN | A | 1205 | | | | 2 | | | |

FLIGHT STATUS TABLE

U.S. PATENT DOCUMENTS

| | | | |
|---|---|---|---|
| 6,591,263 B1 * | 7/2003 | Becker et al. | 707/3 |
| 6,618,668 B1 | 9/2003 | Laird | 701/204 |
| 2002/0198747 A1 * | 12/2002 | Boyer et al. | 705/5 |
| 2003/0233190 A1 * | 12/2003 | Jones | 701/207 |
| 2004/0044467 A1 * | 3/2004 | Laird | 701/207 |

OTHER PUBLICATIONS

Schlumberger Demonstrates Unique Value-added Loyalty Application at CTIA Wireless '99, from the Business Wire dated Feb. 8, 1999.*

* cited by examiner

| APPLICATION NOTIFICATION TABLE | |
|---|---|
| APPLICATION | FTP SERVER |
| QPAX | 153.45.56.55 |
| INTEL | 203.23.65.4 |
| AIR MEDIA | 40.45.75.153 |
| ORBITZ | 206.54.33.4 |
| DATA DISTRIBUTION | 45.66.175.5 |
| TRIP MANAGER | 193.61.44.6 |

| FLT NBR | LEG | DEPART ARRIVE | SCHEDULE | NEW | ESTIMATED TIME OF DEPARTURE | ACTUAL TIME OF DEPARTURE | DC | GATE | BAG | TIME |
|---|---|---|---|---|---|---|---|---|---|---|
| AA2856 | PHX | D | 0845 | | | | 0 | 34 | | |
| | LAX | A | 1014 | | | | 0 | D12 | | |
| AA2856 | LAX | D | 1105 | | | | 0 | C7 | | |
| | SFO | A | 1225 | | | | 0 | 12 | | |
| NW19 | BOS | D | 1135 | | | | 0 | | | |
| | MSP | A | 1351 | | | | 0 | | | |
| NW19 | MSP | D | 1445 | | | | 0 | | | |
| | NRT | A | 1655 | | | | 1 | | | |
| NW19 | NRT | D | 1815 | | | | 1 | | | |
| | SIN | A | 1205 | | | | 2 | | | |

METHOD, COMPUTER PROGRAM, AND SYSTEM FOR PUSHING FLIGHT INFORMATION TO PASSENGERS

BACKGROUND OF THE INVENTION

1. Field of the Invention

The present invention relates to airline flight notification methods and systems. More particularly, the invention relates to a method, computer program, and system for automatically pushing flight status information to passengers and/or their agents whenever an airline flight is delayed, cancelled, or otherwise subject to a status change.

2. Description of the Prior Art

Millions of airline flights are completed each year in the U.S. alone. Unfortunately, many airline flights are delayed, cancelled, or otherwise subject to status changes due to severe weather, unscheduled aircraft repairs, and other causes.

Currently, no known systems or methods exist for automatically notifying passengers when their flights are subject to a status change. Passengers instead must seek out such information by calling their travel agents, checking flight status reports, or by similar methods using the Internet. Most passengers do not bother to check the status of their flights until they get to the airport and therefore often must wait at the airport when flights are delayed and/or cancelled. Waiting long periods of time at airports is often cited as one of the primary complaints against the airline industry.

SUMMARY OF THE INVENTION

The present invention solves the above-described problems and provides a distinct advance in the art of flight status notification systems and methods. More particularly, the present invention provides a method, computer program, and system for automatically pushing flight status information to passengers and/or their agents whenever an airline flight is delayed, cancelled, or otherwise subject to a status change so that the passengers can plan accordingly without having to seek out such information.

The invention is preferably implemented by a global airline distribution provider such as Worldspan, L.P. and can be used by any airline passenger who directly or indirectly reserves a flight with the provider. A passenger first makes an airline reservation and indicates whether he or she wishes to be automatically notified of flight status changes. If so, the passenger is instructed to provide contact information such as an e-mail address, a phone number, or a pager number.

The provider receives updated departure times for all known flights from a reliable source such as the FAA and compares the updated departure times to the scheduled departure times for the flights. If the updated departure time for a flight varies from the scheduled departure time by a predetermined amount, the provider automatically pushes flight status notification information to all passengers on the flight who indicated they wished to receive such information or to the passengers' agents. The information is preferably pushed to the passengers' e-mail accounts, mobile digital phones, or pagers so that the passengers learn about flight arrival/departure time changes as early as possible, thus allowing the passengers to modify their travel plans accordingly. The invention may also be used to push flight status/schedule changes to passengers in a similar manner.

In a preferred embodiment, the invention is implemented with a computer program that instructs a host computer operated by the global airline distribution provider. The computer program includes: a code segment for receiving and storing in a database scheduled times of departure or arrival for substantially all U.S. airline flights departing or arriving within a certain time that the provider holds a confirmed booking for; a code segment for receiving and storing in the database any updated times of departure or arrival for the flights; a code segment for comparing, for each of the flights, the scheduled time of departure or arrival to the updated time of departure or arrival; a code segment for flagging records in the database corresponding to flights in which the updated times of departure or arrival vary from the scheduled times of departure or arrival by a predetermined amount of time; and a code segment for periodically querying all flagged records and pushing notification information to at least one passenger or an agent of the passenger on each flight corresponding to a record that has been flagged.

The present invention reduces the amount of time that travelers must wait at airports for delayed and/or cancelled flights and will therefore likely improve traveler satisfaction levels. The present invention also allows global airline distribution providers to provide a new and valuable service to their airline passengers and to therefore possibly gain more business.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figures 1, 2, 3:
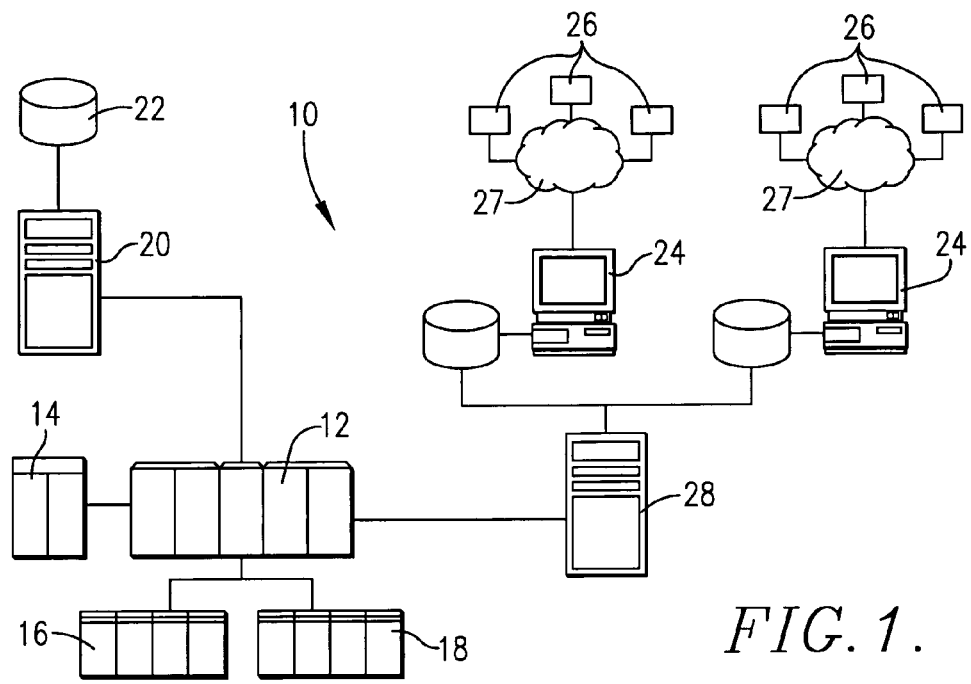
FIG. 1 is a schematic diagram of computer equipment that may be used to implement certain steps of the present invention.
FIG. 2 depicts a flight status table or database that may be used in connection with the present invention.
FIG. 3 depicts an application notification table that may be used in connection with the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention can be implemented in hardware, software, firmware, or a combination thereof. In a preferred embodiment, however, the invention is implemented with a computer program and computer equipment broadly referred to by the numeral 10 in FIG. 1. The computer program and equipment illustrated and described herein are merely examples of a program and equipment that may be used to implement the present invention and may be replaced with other programs and computer equipment without departing from the scope of the present invention.

The computer equipment 10 includes a host computer 12 that is preferably operated by a global airline distribution provider such as Worldspan, L.P. The host computer 12 may be part of an IBM Transaction Processing Facility (TPF) host and preferably consists of 8 IBM OS/390 mainframes loosely coupled together and operating as one entity. The host computer 12 may be coupled with an OS/390 computer 14 having a scheduling utility function for populating a flight status table or database as depicted in FIG. 2 and described below.

The host computer 12 is also preferably coupled with mainframe computers 16 operated by partner airlines such as Delta, TWA, and Northwest and with mainframe computers 18 operated by other airlines with which the operator of the host computer 12 has a participating carrier agreement. The host computer 12 and mainframe computers 16,18 are preferably connected by dedicated, high bandwidth, digital lines such as multiple T1 or T3 lines.

The host computer 12 may also be coupled with a gateway computer 20 and a database 22 for storing the flight status table. The gateway 20 is responsible for the connectivity between the host computer 12 and the flight status table and enables real-time update fields to be populated with actual flight departure/arrival times as described in more detail below.

The computer equipment 10 also preferably includes customer computer systems 24 operated by customers or partners of the host computer 12 operator. The systems 24 are preferably connected to the host computer 12 by high bandwidth T1 or T3 lines. Any number of systems 24 may be connected to the host computer 12. The customers may include, for example, Priceline.com, Expedia.com, QPAX, Intel, Air Media, Orbitz, Data Distribution, Trip Manager or travel agents. The customers are also referred to herein as "agents" of passengers.

The customer computer systems 24 are in turn coupled with computing and/or communication devices 26 operated by airline passengers. The devices 26 may include any equipment capable of receiving messages via the present invention such as personal computers, pagers, or mobile phones. The devices 26 may be coupled to the customer computer systems 24 by any known communication networks 27 such as the Internet, wireless phone networks, the public switched telephone network (PSTN), etc. The devices 26 may also be coupled directly with the host computer 12 via the networks 27 or other networks.

The computer equipment 10 also preferably includes an application messenger 28 coupled between the host computer 12 and the customer computer systems 24. The application messenger 28 is preferably (but not limited to) a MS Windows NT server which supports an application notification table as depicted in FIG. 3 and described in more detail below.

The computer program of the present invention is stored in or on computer-readable medium residing on or accessible by the host computer 12 for instructing the host computer 12 and the other components of equipment 10 to operate as described herein. The computer program preferably comprises an ordered listing of executable instructions for implementing logical functions in the host computer 12 or the computer equipment coupled with the host computer 12. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The functionality and operation of a preferred implementation of the computer program is described below. In this regard, some of the described functionality may represent a module segment or portion of code of the computer program of the present invention which comprises one or more executable instructions for implementing the specified logical function or functions. In some alternative implementations, the functions described may occur out of the order described below. For example, functionalities described in succession may in fact be executed substantially concurrently, or the functionalities may sometimes be executed in the reverse order depending upon the functionality involved.

The present invention can be used by any airline passenger who directly or indirectly reserves a flight with the operator of the host computer 12. A passenger first makes an airline reservation by accessing the host computer 12 directly or via one of the customer computer systems 24. The passenger may access the host computer 12 or systems 24 using one of the computer and/or communication devices 26 depicted in FIG. 1 or by any other conventional means. The passenger then makes an airline reservation in a conventional manner to create a passenger name record (PNR).

The host computer 12 or the customer computer system 24 accessed by the passenger next asks the passenger whether he or she wishes to be automatically notified of a flight status change. For example, the host computer 12 or system 24 may present a "Travel Alert" button that may be pressed by the passenger to indicate a desire to be notified of flight status changes. The host computer 12 or system 24 then presents a screen that prompts the passenger to enter contact information such as an e-mail address, a mobile phone number, or a pager number. This contact information is preferably added to the PNR created for the passenger. The host computer 12 then queues the PNR to a date-ranged queue using the scheduled date and time of departure or arrival of the flight as the queuing mechanism.

The host computer 12 periodically obtains updated flight status information including updated flight departure and arrival times from a reliable source. The updated flight departure and/or arrival times may be obtained from a number of sources including an FAA ASDI feed obtained directly from the FAA or a commercial reseller such as Flight.com. Other sources include MVS tapes obtained from the Official Airline Guide (OAG).

The host computer 12 accesses the date-ranged queue each day and compares the PNRs for flights scheduled that day to any updated flight departure or arrival times received from the FAA or other source. If the scheduled departure or arrival times for the flights vary from the updated departure or arrival times for the flights by a predetermined amount (e.g. 10-60 minutes), the host computer 12 automatically pushes flight status notification information to all passengers on the changed flights who indicated they wished to receive such information. The information is preferably pushed to the passengers' e-mail accounts, mobile digital phones, or pagers so that the passengers may learn about flight status changes as early as possible, thus allowing the passengers to modify their travel plans accordingly.

The notifications are preferably sent from the host computer 12 to the application messenger 28. The application messenger 28 supports an application notification table depicted in FIG. 3 that contains contact information for all the customer computer systems 24 connected with the host computer 12. When the host computer 12 determines that a flight status notification is to be sent to a passenger, it directs the application messenger 28 to transmit a generic XML message to the appropriate system 24. The customer computer systems 24 are then responsible for distributing the notifications to their passengers in a format that is appropriate for the passengers' computer and/or communication devices 26.

The above-described methodology of informing passengers of flight status changes requires the host computer 12 to access and analyze each and every PNR in the date-ranged queue regardless of whether the PNRs correspond to a flight that has been the subject of a flight status change. This places a substantial burden on the host computer 12 and therefore requires a significant amount of computing power.

In a preferred, alternative embodiment of the present invention, the date-ranged queue described above is replaced with a flight status table or database as depicted in FIG. 2. The flight status table is populated with information on all known flights departing within a predetermined period of time such as a 24-hour period. The flight status table preferably includes, for each known flight, columns for the flight number 30, the airport leg 32, the direction (depart or arrive) 34, the scheduled departure or arrival time 36, a new departure or arrival time 38, an estimated departure or arrival time 40, an actual departure or arrival time 42, a gate 44, a baggage claim area 46, and a date stamp 48 that indicates the last time the information in each row was updated.

The scheduled departure or arrival time column 38 merely lists the time a flight is scheduled to depart or arrive. The new departure or arrival time column 38 lists updated departure or arrival times received more than one day before the scheduled departure or arrival time. The estimated departure or arrival time column 40 lists updated departure or arrival times received on the same day as the scheduled time of departure or arrival. The information in the flight status table is preferably obtained from the same sources described in the first embodiment of the invention above.

The host computer 12, the OS/390 computer 14, and the gateway 20 populate the flight status table with the above described information. The information in the flight status table is preferably continuously refreshed. Alternately, the information may be refreshed at varying times depending on how close a flight is from its scheduled departure or arrival time. For example, the information may be refreshed every 30 minutes if a flight is scheduled to depart or arrive in 8 hours or more, every 20 minutes if a flight is scheduled to depart or arrive in 4-8 hours, and every 10 minutes if a flight is scheduled to depart or arrive in less than 4 hours.

The host computer 12 continuously compares the scheduled times in column 36 to the new times in column 38 and flags the row or record corresponding to the flight if the new time varies from the scheduled time by a predetermined amount. The amount of time required to cause a record to be flagged may be selected by the operator and is preferably between 10 and 60 minutes. The host computer 12 performs a similar comparison between the estimated times in column 40 and new times in column 38. Any variances between these times that exceed 10-60 minutes are also flagged.

The host computer 12 also periodically queries the flight status table to find all flagged records. The host computer 12 then automatically pushes flight status notifications to the passengers of flights corresponding to the flagged records by the same method as described in the first embodiment above. Because the host computer 12 only has to analyze flagged records rather than all the PNRs as with the first embodiment described above, the computing power required in the second embodiment of the invention is significantly less than the computing power required by the first embodiment.

From the foregoing description of a preferred embodiment of the present invention, those skilled in the art will appreciate that the present invention reduces the amount of time that travelers must wait at airports for delayed and/or cancelled flights and will therefore likely improve traveler satisfaction levels. The present invention also allows global airline distribution providers to provide a new and valuable service to their airline passengers and to therefore possibly gain more business.

Although the invention has been described with reference to the preferred embodiments illustrated in the attached drawing figures, it is noted that equivalents may be employed and substitutions made herein without departing from the scope of the invention as recited in the claims. For example, although the host computer 12 preferably sends flight status notifications to passengers indirectly through the customer computer systems 24, the host computer 12 may also send such notifications directly to the passengers. Furthermore, although the present invention preferably uses either the flight status table depicted in FIG. 2 or the date-ranged queue methodology described in the first embodiment of the invention above to compare scheduled times of departure or arrival with changed times of departure or arrival, other methods of comparison may be used without departing from the scope of the present invention.

Having thus described the preferred embodiment of the invention, what is claimed as new and desired to be protected by Letters Patent includes the following:

1. A computer program stored on a computer-readable medium for operating a host computer to automatically notify passengers or agents of changes in status for airline flights, the computer program comprising:

a code segment for receiving passenger reservation information from airline passengers or agents of the passengers, the passenger reservation information including a request for automatic flight status change notification information for an airline flight a passenger is reserving;

a code segment executed by the host computer for receiving and storing in a database scheduled times of departure or arrival for substantially all U.S. airline flights departing or arriving within a certain time;

a code segment executed by the host computer for receiving and storing in the database any updated times of departure or arrival for the flights;

a code segment executed by the host computer for comparing, for each of the flights, the scheduled time of departure or arrival to the updated time of departure or arrival;

a code segment executed by the host computer for flagging records in the database corresponding only to flights in which the updated times of departure or arrival vary from the scheduled times of departure or arrival by a predetermined amount of time; and a code segment executed by the host computer for periodically querying the database to locate all flagged records and pushing flight status change notification information to each passenger or agent who has requested notification information on each flight corresponding to a record that has been flagged.

2. The computer program as set forth in claim 1, the notification information including information relating to the updated time of departure or arrival for the airline flight.

3. The computer program as set forth in claim 1, the predetermined amount of time being between 10-60 minutes.

4. The computer program as set forth in claim 1, the predetermined amount of time being approximately 30 minutes.

5. The computer program as set forth in claim 1, the host computer comprising a plurality of computing devices.

6. The computer program as set forth in claim 1, the host computer comprising a computer network.

7. The computer program as set forth in claim 1, wherein the notification information is pushed through electronic mail.

\* \* \* \* \*